United States Patent [19]

Erhan

[11] Patent Number: 5,284,683
[45] Date of Patent: Feb. 8, 1994

[54] METHOD FOR METALLIZATION OF PLASTICS USING POLY-DIAMINE-QUINONE POLYMERS AS A BINDER

[76] Inventor: Semih Erhan, 2301 Cherry St., Apt. 12-B, Philadelphia, Pa. 19103

[21] Appl. No.: 776,616

[22] Filed: Oct. 15, 1991

[51] Int. Cl.$^5$ .............................................. B05D 1/30
[52] U.S. Cl. ................... 427/404; 427/443.1; 427/205; 427/261; 427/322; 427/458
[58] Field of Search ............. 427/404, 306, 208.8, 427/207.1, 208.4, 443.1, 205, 261, 322, 458

[56] References Cited

U.S. PATENT DOCUMENTS

| Re. 33,108 | 11/1989 | Ishikawa et al. | 427/97 |
|---|---|---|---|
| 3,222,218 | 12/1965 | Beltzer et al. | 427/306 |
| 3,775,157 | 11/1973 | Fromson | 427/443.1 |
| 4,831,107 | 5/1989 | Erhan | 528/229 |
| 4,882,413 | 11/1989 | Erhan | 528/229 |
| 4,891,246 | 1/1990 | McEwen et al. | 427/229 |
| 4,981,946 | 1/1991 | Erhan | 528/229 |
| 5,135,779 | 8/1992 | Viehbeck et al. | 427/306 |

Primary Examiner—Shrive Beck
Assistant Examiner—Diana Dudash
Attorney, Agent, or Firm—Eckert Seamans Cherin & Mellott

[57] ABSTRACT

A metal coated plastic and method of preparation thereof use a poly-diamine-quinone polymer as a binder, whereby a metal coating adheres to and is immobilized on a plastic surface. The poly-diamine-quinone includes the formula:

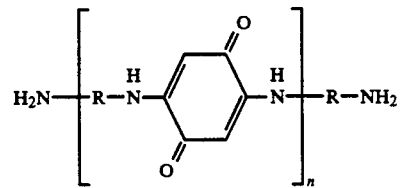

wherein R is alkyl, monocyclic, cycloalkyl, monocyclic heterocyclic, aromatic, siloxyl, silyl and the alkyl, alkoxy, carboxyl and amino derivatives thereof, and n is about 70–700. The method of preparation includes coating a plastic substrate with a poly-diamine-quinone polymer, applying a metal coating to the poly-diamine-quinone polymer coated plastic, and curing the metal coated plastic. A further method is disclosed for imparting an electrical conductance to the metal coated plastic of the invention.

26 Claims, No Drawings

METHOD FOR METALLIZATION OF PLASTICS USING POLY-DIAMINE-QUINONE POLYMERS AS A BINDER

BACKGROUND OF THE INVENTION

1. Field of the Invention

The invention relates to the field of metallization of plastics, especially to a generic method for preparing metal coated plastics, using inherently metal binding poly-diamine-quinone polymers as a binder, for direct immobilization of powdered metals on plastic surfaces forming a metal coated plastic composite, which subsequently can be rendered electrically conducting.

2. Prior Art

In the field of metallization of plastics, many techniques are known to deposit metal atoms onto plastic surfaces, thereby rendering the metal atoms immobile thereon. One technique involves vacuum deposition of metal atoms on plastic surfaces, wherein a thin coating of metal is deposited by condensation on a cool plastic surface in a vacuum. Typically a high vacuum is required, such as 0.1 micron mercury or better. It is also necessary to heat the metal atoms to be deposited to high temperatures.

Another technique involves plasma cathode sputtering of metal atoms onto a glass, plastic, metal or other surfaces, wherein metal atoms are ejected from the surface of a plasma cathode as the result of heavy ion impact and are thereby deposited on a target surface. High temperatures and high vacuum pressure are not required in this technique.

A further technique to deposit metal atoms on a plastic surface involves electroless plating, wherein a metal coating is deposited by immersion of a metal or non-metal surface in a bath containing a chemical reducing agent. Usually the plastic surface is first sensitized with a strong reducing agent spread over the surface. Then a catalytic amount of a noble metal in a bath is precipitated by reduction onto the sensitized surface.

However, these foregoing techniques, i.e., vacuum deposition, cathode sputtering and electroless plating, have to be tailored to suit specific applications depending upon the metal as well as the plastic chosen. The present invention provides a generic procedure to deposit metal atoms onto plastic surfaces that can be applied to most plastics and nearly all metals and their alloys except alkali and alkaline earth metals chosen without tailoring the process to the particular species involved.

The present invention incorporates, by reference, the use of a particular family of polymers that have very strong inherent affinity towards all metals and their alloys, known as poly-diamine-quinone-polymers (PAQ), which are described in U.S. Pat. Nos. 4,831,107, 4,882,413, and 4,981,946, as a binder to immobilize metal atoms on plastic surfaces.

The PAQ polymers are prepared by condensing various aliphatic and aromatic polyamines with different quinones. Depending upon the characteristics of the ingredients these polymers vary from infusible and intractable ones to those that are tacky, flexible, or brittle. Some can be used as adhesives and coatings. They are also capable of forming fibers from melt as well as solution. Most are curable with heat and chemicals. Before curing they are soluble in lower alcohols such as methanol, ethanol, etc., acetone and DMSO but insoluble in water and ethyl ether. They can be applied by dipping, spraying, brushing and melt coating. Once cured, they are insoluble in solvents and impervious to water, salt water, boiling and autoclaving. They are non-wettable by water. They can displace water from surfaces of metals, including dripping wet rusted steel surfaces.

The present invention provides a generic method of applying metal coatings to plastic surfaces that is applicable to most plastics and nearly all metals and their alloys including gold and platinum and excepting alkali and alkaline earth metals and mercury, using a poly-diamine-quinone polymer as an adhesive binder, which offers distinct advantages over prior techniques of deposition of metal coatings onto plastic surfaces. The present invention is easy to prepare and is more economical to produce in large quantities.

The present invention further provides a method for imparting an electrical conductance very easily to the metal coated plastic product produced by the method of this invention. All of the deposited metals are electrically conducting to varying degrees. Some, like nickel, conduct with practically no resistance, that is, no discernable voltage drop when a potential of 30 volts is applied. Others show greater resistance. However these can be made electrically conducting by known techniques for imparting electrical conductance. One technique of imparting an electrical conductance to a substrate is by immersing substrate into copper-plating baths containing copper sulfate solutions and derivatives thereof.

The present invention is applicable to, but not limited to, applications where the metal coated plastic can be used as a decorative surface and as a stable, abrasion resistant, no flake, polishable surface. Such applications include various plastics used to simulate metal, such as automobile bumper design or the like and decorative jewelry design. Other applications where an electrically conductive surface is required may also employ this invention, for example, the preparation of printed circuit boards.

SUMMARY OF THE INVENTION

It is an object of the invention to provide a generic method to deposit metal atoms over plastic surfaces that is applicable to most plastic surfaces and nearly all metal atoms and their alloys, except alkali and alkaline earth metals and mercury.

It is another object of the invention to increase the receptivity of a plastic surface to a metal by using poly-diamine-quinone polymers as a binder.

It is another object of the invention to provide an easy to prepare, and hence more economical to produce in large quantities, method of metallization of plastics by using poly-diamine-quinone polymers as binders which have an inherent affinities to bind to all metals and their alloys.

It is a further object of the invention to provide a method to impart an electrical conductance to the metal coated plastic produced by the method of this invention.

These and other objects are accomplished by a method for preparing metal coated plastics using poly-diamine-quinone polymers as the binder and by a method for imparting an electrical conductance thereto.

More particularly, at least a portion of at least one surface of a plastic is coated with a layer of poly-diamine-quinone polymers. All portions of the plastic that are coated with poly-diamine-quinone polymer will subsequently have metal applied thereto. Depending on the application, more than one of the surfaces of the plastic may be coated. And further depending on the application, the entire surface of the plastic may be coated. Prior to coating, the plastic surface may be treated with an organic solvent in order to clean and soften the plastic surface in preparation for the coating composition. Most plastics may be used, such as polystyrene, polyacrylics, polycarbonates, polyphenyleneoxides, polyetherimides, polyacetals (DELRIN ®), polyethylenes, nylons and others.

The poly-diamine-quinone polymer coating comprises the general formula:

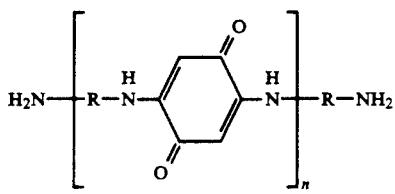

wherein R is alkyl, monocyclic, cycloalkyl, monocyclic heterocyclic, aromatic, siloxyl, silyl and the alkyl, alkoxy, carboxyl and amino substituted derivatives thereof, and n is about 70 to 700, which are described in U.S Pat. Nos. 4,831,107, 4,882,413 and 4,981,946 and incorporated by reference herein.

Prior to the coating step the poly-diamine-quinone polymer may be dissolved in a solvent, i.e., a suitable carrier, to facilitate sufficient coating coverage over the portion of the plastic surface that will be coated. The solvent is selected from the group consisting of alcohols, ketones, esters, hydrocarbons and chlorinated derivatives thereof.

The poly-diamine-quinone polymer coating is used to effect binding of a plastic surface to metal atoms. Poly-diamine-quinone polymers have very strong inherent affinity towards all metals and their alloys. This affinity is due to chemisorption, referring to a chemical adsorption process in which very strong chemical bonds are formed between gas or liquid molecules and a solid surface, in which free electrons of electronegative elements are contributed to electron-poor outer orbitals of metals thus providing different forces than involved in polymeric adhesive bonding of metals. The affinity to metal is strong enough to displace water from wet, rusty steel surfaces and so the poly-diamine-quinone coatings have very strong anticorrosive characteristics. Thus once the plastic surface is coated with a poly-diamine-quinone polymer, the plastic metallization process becomes very easy.

Coating may be accomplished by either spraying, brushing, dipping, or wire-wound application of the poly-diamine-quinone polymer onto the plastic surface. The poly-diamine-quinone coating is preferably 0.1 to 5 dry mils thick.

Subsequent to the coating step, the plastic surface coated with the poly-diamine-quinone polymer typically is allowed to dry to tackiness.

Thereafter a metal coating is applied over the poly-diamine-quinone polymer coating. Nearly all metals and their alloys can be used as the metal coating, including gold and platinum but excepting alkali and alkaline earth metals and mercury. The metal typically comprises metal powders and their alloys in the form of a metal sheet or preferably metal powders.

It is preferred to use a metal powder comprising one micron to 100 mesh powders, preferably 325 mesh or finer. The metal powder can be an alloy such as bronze, brass, or steel. The metal powder can also be a metal such as aluminum, nickel, and others. The metal coating is preferably of a thickness between 0.5 to 5 mils thick. Thus, a metal coated plastic composite is formed, wherein the metal is immobilized and bound to the plastic surface by the poly-diamine-quinone polymer binder.

The type of metal used has no effect on the poly-diamine-quinone polymer's inherent affinity towards metals. Thus, one skilled in the art can apply a metal to a plastic surface very easily using the poly-diamine-quinone polymer as a binder between the plastic surfaces and the metals and their alloys. The application of the metal may be accomplished by either electrostatic depositing, sprinkling, or pressing the coated plastic against the metal.

Subsequent to the metal coating application step, the metal coated plastic composite with a poly-diamine-quinone polymer binder is typically allowed to dry completely prior to curing of the composite.

Thereafter the metal coated plastic composite binder, i.e, the poly-diamine-polymer, is cured, whereby adhesion of the metal coating to the plastic surface becomes permanent. The poly-diamine-quinone polymer is cured either thermally or chemically or with a combination of both.

Thermal curing occurs between 90° C. and 150° C. by any heating technique, i.e., conventional or infrared radiation. Chemical curing involves the addition of curing agents to the polymer. The chemical curing agents may be selected from the group consisting of diamines, epoxides, isocyanates, zirconyl salts, titanyl salts, and polyaziridines. Once cured the poly-diamine-quinone polymer binder is insoluble in solvents and impervious to water, salt water, boiling, and autoclaving thus creating a stable linkage between the metal and the plastic surface.

Subsequent to the curing step, the metal coated plastic product may be polished or shined using an abrasive. The metal coated plastic can be designed to resist abrasion and scratching. It is typically a stable and non-flaking coating.

And also subsequent to the curing step, the metal coated plastic may have a spontaneous electrical conductance or such imparted thereto. An electrical conductance is imparted to a metallized plastic by immersing the metallized plastic product in a copper plating bath containing either a copper sulfate solution, a copper sulfate solution that has been complexed with chelators, or a copper sulfate solution that has been complexed with chelators and further comprising a reducing agent such as sodium hypophosphite and sodium dithionite. It is preferred to immerse the metallized plastic product in the copper sulfate solution and derivative solutions thereof as described above for 30 to 36 hours.

DESCRIPTION OF THE PREFERRED EMBODIMENTS OF THE INVENTION

The procedure of the present invention consists of a series of operations, generally as follows:

A plastic substrate is provided. The plastic substrate may be selected from the group consisting of, and not limited to, polystyrenes, polyacrylics, polycarbonates, polyphenylene oxides, polyether imides, polyacetals (DELRIN ®), nylons and polyethylenes.

The plastic surface is treated with an organic solvent which is selected from the group consisting of alcohols, ketones, esters, hydrocarbons and chlorinated derivatives there of.

The poly-diamine-quinone polymers, comprising the general formula:

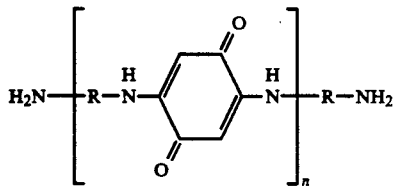

wherein R is alkyl, monocyclic, cycloalkyl, monocyclic heterocyclic, aromatic, siloxyl, silyl and the alkyl, alkoxy, carboxyl and amino substituted derivatives thereof, and, n is about 70 to 700, are dissolved in an organic solvent carrier, wherein the solvent is selected from the group consisting of alcohols, ketones, esters, hydrocarbons and chlorinated derivatives thereof.

The plastic surface is coated with the poly-diamine-quinone polymer coating solution, which is effected either by spraying, brushing, dipping, or wire-wound application. Preferably, the poly-diamine-quinone polymer coating thickness is between 0.1 to 5 dry mils.

The poly-diamine-quinone polymer coating is allowed to dry to tackiness.

A metal coating, preferably comprising metal powders or their alloy powders of 1 micron to 100 mesh, preferably 325 mesh or finer, is applied over the tacky poly-diamine-quinone polymer coating on the plastic surface, which is effected either by electrostatic depositing, sprinkling, or pressing the poly-diamine-quinone coated plastic against the metal. Preferably, the metal coating film or layer thickness is between 0.5 to 5 mils.

The dried metal coated plastic with a poly-diamine-quinone polymer binder is cured either thermally or chemically. Chemical curing can be effected by using chemical curing agents selected from the group comprising diamines, epoxides, isocyanates, zirconyl salts, titanyl salts, and polyaziridines at room temperature. Thermal curing can be effected by conventional heating at 90° C.–150° C.

The cured metal coated plastic, with a poly-diamine-quinone polymer binder product is polished with abrasives.

The polished metal coated plastic with a poly-diamine-quinone polymer binder is imparted with an electrical conductance, which can be effected by immersing the product in either a copper sulfate solution alone, in a copper sulfate solution complexed with chelators, or in a copper sulfate solution complexed with chelators and further comprising a reducing agent selected from the group consisting of sodium hypophosphite and sodium dithionite. Imparting an electrical conductance can be effected by immersing to product in the copper sulfate solutions for 30–36 hours.

EXAMPLE 1

Preparation of poly-diamine-quinone polymer coated polycarbonate.

The polycarbonate plastic is cleaned with methylene chloride. Poly-diamine-quinone polymer coating is prepared by mixing poly-diamine-quinone polymer and Epoxy novolac 438 (1:1) by preparing an 80% solids content poly-diamine-quinone polymer solution in xylene: n-butanol (1:1) and an 80% solution of Epoxy novolac 438 in MEK. The poly-diamine-quinone polymer coating solution is applied by a wire-wound applicator. The sample is allowed to dry and thereafter is either allowed to cure at ambient temperature or thermally cured at 110° C. for 2 hours.

EXAMPLE 2

Preparation of 2-phenylbenzoquinone-1,2 - diaminedodecane polymer coated polyacetal engineering plastic, known as "DELRIN ®".

The polyacetal engineering plastic, known as "DELRIN ®", is cleaned with ethylene chloride. A 2-phenylbenzoquinone-1,12-diaminododecane coating is prepared by forming a 50% solution of 2-phenylbenzoquinone—1,12-diaminododecane in methylene chloride—1,2,3-trichloropropane solvent (1:1). The coating solution is applied by a wire-wound applicator. The sample is allowed to dry and thereafter is either allowed to cure at ambient temperature overnight or thermally cure at 110° C. for two hours.

EXAMPLE 3

Preparation of the metal coated plastic product of polyethylene plastic, 2-phenylbenzoquinone-1,12,-diaminododecane polymer coating, and aluminum metal powder.

The polyethylene plastic is cleaned with methylene chloride. A 2-phenylbenzoquinone-1,12-diaminododecane coating solution is prepared by making a 50% solution of 2-phenylbenzoquinone-1,12-diaminododecane in a mixture of methylene chloride-1,2,3-trichloropropane solvent (1:1). The coating is applied by a wire-wound applicator or by spraying. After applied, the coating is allowed to dry to tackiness. 30 micron aluminum metal powder is sprinkled over the coating. The aluminum metal coated polyethylene with the 2-phenylbenzoquinone-1, 12-diaminododecane polymer binder is allowed to dry. Thereafter the sample is thermally cured in an oven at 140° C. for three hours. The cured sample can be polished with abrasive.

EXAMPLE 4

Preparation of the metal coated plastic product of polyphenyleneoxideplastic,2-phenylbenzoquinone-1,8-diaminooctane polymer coating, and nickel metal powder.

The polyphenyleneoxide plastic is cleaned with methylene chloride. A 2-phenylbenzoquinone-1,8-diaminooctane coating solution is prepared by making a 50% solution of 2-phenylbenzoquinone-1,8-diaminooctane in a mixture of methylene chloride-1,2,3-trichloropropane solvent (1:1). The coating is applied. After application, the polymer coating is allowed to dry and thicken to tackiness. 100 mesh nickel metal powder is pressed against the tacky polymer coating. The dried nickel metal coated plastic with 2-phenylbenzoquinone- 1,8-diaminooctane polymer binder is thermally cured at 140° C. for 3 hours. The product is inherently electrically conducting.

EXAMPLE 5

Preparation of the metal coated plastic product of polyethylene plastic, 2-phenylbenzoquinone-1,12-diaminododecane polymer coating and aluminum metal powder metal imparted with an electrical conductance.

Following the procedure of example 3, the aluminum metal coated plastic product is immersed in 10% copper sulfate solution for 36 hours. After removal from the immersion bath, the electrically conductive metallized plastic is washed with deionized water and allowed to dry at ambient temperatures.

The invention having been disclosed in connection with certain preferred embodiments, variations within the scope and spirit of the invention will become apparent to persons skilled in the art.

The invention is not intended to be limited to the preferred embodiments, which are exemplary. Reference should be made to the appended claims rather than the foregoing examples, in order to assess the scope of the invention in which exclusive rights are claimed.

What is claimed is:

1. A method of applying metal to a plastic substrate, comprising:

coating at least a portion of at least one surface of a plastic substrate with a poly-diamine-quinone polymer comprising the general formula:

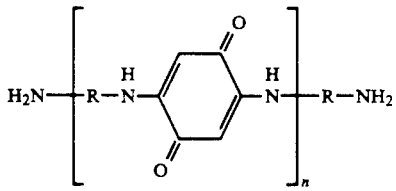

wherein each R is independently selected from the group consisting of alkyl, monocyclic, cycloalkyl, monocyclic heterocyclic, aromatic, siloxyl, silyl and the alkyl, alkoxy, carboxyl and amino derivatives thereof, and n is about 70–700, thereby forming a poly-diamine-quinone coated plastic substrate;

applying a metal or metal alloy, not including alkali and alkaline earth metals and mercury, to the poly-diamine-quinone coated plastic substrate, thereby forming a metallized plastic substrate; and, curing the poly-diamine quinone polymer of the metallized plastic substrate, whereby the metal or metal alloy adheres to the plastic substrate.

2. The method as defined by claim 1, wherein said plastic substrate is selected from the group consisting of polystyrenes, polyacrylics, polycarbonates, polyphenylene oxides, polyetherimides, polyacetals, nylons and polyethylenes.

3. The method as defined by claim 1, which further comprises:
   cleaning said plastic substrate surface with solvent prior to said coating step.

4. The method as defined by claim 1, which further comprises:
   solubilizing said poly-diamine-quinone polymer in a solvent carrier prior to said coating step.

5. The method as defined by claim 3, further comprising solubilizing said poly-diamine-quinone polymer in a solvent carrier prior to said coating step, and wherein said solvent is selected from the group consisting of alcohols, ketones, esters, hydrocarbons, and chlorinated derivatives thereof.

6. The method as defined by claim 1, wherein said poly-diamine-quinone polymer coating step is performed by spraying, brushing, dipping, or wire-wound application.

7. The method as defined by claim 1, wherein said poly-diamine-quinone polymer coating step is performed on only one surface of said plastic substrate with said poly-diamine-quinone polymer.

8. The method as defined by claim 1, wherein said poly-diamine-quinone polymer coating is 0.1 to 5 dry mils thick.

9. The method as defined by claim 1, which further comprises:
   drying said poly-diamine-quinone polymer to tackiness after said step of coating with poly-diamine-quinone polymer and before said step of applying the metal or metal alloy.

10. The method as defined by claim 1, wherein said step of applying the metal or metal alloy is performed by applying the metal or metal alloy by sprinkling, electrostatic depositing, or pressing said poly-diamine-quinone coated plastic substrate against said metal or metal alloy.

11. The method as defined by claim 1, wherein said metal or metal alloy is a continuous film or layer.

12. The method as defined by claim 1, wherein said metal or metal alloy is a noncontinuous film or layer.

13. The method as defined by claim 1, wherein said metal or metal alloy is 0.5 to 5 mils thick.

14. The method as defined by claim 1, wherein said metal or metal alloy is a powder.

15. The method as defined by claim 1, wherein said metal alloy powder is selected from the group consisting of bronze powder, brass powder and steel powder.

16. The method as defined by claim 14, wherein said metal or metal alloy powder is 1 micron to 100 mesh powder.

17. The method as defined by claim 16, wherein said metal or metal alloy powder is 325 mesh or finer powder.

18. The method as defined by claim 1, which further comprises:
   drying said metallized plastic substrate completely after said step of applying a metal or metal alloy and before said step of curing said poly-diamine-quinone polymer.

19. The method as defined by claim 1, wherein said step of curing is performed by thermal curing, chemical curing, or a combination thereof.

20. The method as defined by claim 19, wherein said step of thermal curing is between 90° C.–150° C.

21. The method as defined by claim 19, wherein said step of chemical curing includes adding chemical curing agents to said poly-diamine-quinone polymer.

22. The method as defined by claim 21, wherein said chemical curing agents are selected from the group consisting of diamines, epoxides, isocyanates, zirconyl salts, titanyl salts, and polyaziridines.

23. The method as defined by claim 1, which further comprises:
   polishing said metallized plastic substrate subsequent to said curing step.

24. The method as defined by claim 23, wherein said step of polishing comprises polishing by abrasives.

25. The method as defined by claim 1, which further comprises:
    imparting an electrical conductance to said metallized plastic substrate subsequent to said curing step.

26. The method as defined by claim 25, wherein said step of imparting an electrical conductance to said metallized plastic substrate comprises the step of:
    immersing the metallized plastic substrate in a copper-plating bath, wherein said copper-plating bath is selected from the group consisting of a copper sulfate solution, a copper sulfate solution that has been completed with chelators, and a copper sulfate solution that has been complexed with chelators and further includes a reducing agent selected from the group consisting of sodium hypophosphite and sodium dithionite, wherein said immersing step is for 30 to 36 hours.

* * * * *

UNITED STATES PATENT AND TRADEMARK OFFICE
CERTIFICATE OF CORRECTION

PATENT NO. : 5,284,683
DATED : February 8, 1994
INVENTOR(S) : Semih Erhan

It is certified that error appears in the above-indentified patent and that said Letters Patent is hereby corrected as shown below:

In Column 8, line 37, "claim 1," should read —claim 14,—.

Signed and Sealed this

Ninth Day of August, 1994

Attest:

BRUCE LEHMAN

Attesting Officer

Commissioner of Patents and Trademarks